US008924479B2

(12) United States Patent
Jennings et al.

(10) Patent No.: US 8,924,479 B2
(45) Date of Patent: *Dec. 30, 2014

(54) CONTIGUOUS LOCATION-BASED USER NETWORKS

(71) Applicant: Waldeck Technology, LLC, Wilmington (DE)

(72) Inventors: Kenneth Jennings, Durham, NC (US); Steven L. Petersen, Los Gatos, CA (US)

(73) Assignee: Waldeck Technology, LLC, Wilmington, DE (US)

(*) Notice: Subject to any disclaimer, the term of this patent is extended or adjusted under 35 U.S.C. 154(b) by 1 day.

This patent is subject to a terminal disclaimer.

(21) Appl. No.: 13/845,495

(22) Filed: Mar. 18, 2013

(65) Prior Publication Data
US 2013/0232201 A1   Sep. 5, 2013

Related U.S. Application Data

(63) Continuation of application No. 13/036,389, filed on Feb. 28, 2011, now Pat. No. 8,417,780, which is a continuation of application No. 12/013,186, filed on Jan. 11, 2008, now Pat. No. 8,010,601.

(60) Provisional application No. 60/016,084, filed on Dec. 21, 2007.

(51) Int. Cl.
  *G06F 15/16*   (2006.01)
  *H04L 29/08*   (2006.01)
  *H04W 4/02*   (2009.01)
  *H04W 8/00*   (2009.01)
  *H04W 4/08*   (2009.01)

(52) U.S. Cl.
  CPC .............. *H04L 67/24* (2013.01); *H04L 67/306* (2013.01); *H04W 8/005* (2013.01); *H04W 4/08* (2013.01); *H04L 67/02* (2013.01); *H04W 4/02* (2013.01); *H04L 67/18* (2013.01)
  USPC ........................................... 709/204; 709/203

(58) Field of Classification Search
  USPC .................. 709/203–205, 223–224
  See application file for complete search history.

(56) References Cited

U.S. PATENT DOCUMENTS 5,493,692 A   2/1996   Theimer et al.
5,539,232 A   7/1996   Nakanishi et al.
(Continued)

FOREIGN PATENT DOCUMENTS

EP   1463354   12/2005
GB   2399928   9/2004
(Continued)

OTHER PUBLICATIONS

"Anthem—Overview," at <http://www.intercastingcorp.com/platform/anthem>, copyright 2004-2007, Intercasting Corp., printed Jan. 16, 2008, 2 pages.
(Continued)

*Primary Examiner* — Philip B Tran

(57) ABSTRACT

Contiguous location based user networks are disclosed herein. A method includes receiving an identification of an area of interest associated with a user of, and transmitting the identification of the area of interest to a server. The method includes determining a location of the user device and transmitting the location to the server. The method includes receiving information identifying a proximity group comprising the user and a plurality of other users. The proximity group includes least one other user being within a proximate area of the location of the user device and having an area of interest corresponding to the area of interest of the user. The proximate area corresponds to a second geographic region smaller than the area of interest. The proximity group further comprising at least one additional other user identified as a neighbor of each of the user and the at least one other user.

23 Claims, 12 Drawing Sheets

(56) References Cited

U.S. PATENT DOCUMENTS

| | | |
|---|---|---|
| 5,754,939 A | 5/1998 | Herz et al. |
| 5,796,727 A | 8/1998 | Harrison et al. |
| 5,903,901 A | 5/1999 | Kawakura et al. |
| 5,949,776 A | 9/1999 | Mahany et al. |
| 6,014,090 A | 1/2000 | Rosen et al. |
| 6,041,311 A | 3/2000 | Chislenko et al. |
| 6,049,711 A | 4/2000 | Ben-Yehezkel et al. |
| 6,204,844 B1 | 3/2001 | Fumarolo et al. |
| 6,240,069 B1 | 5/2001 | Alperovich et al. |
| 6,349,203 B1 | 2/2002 | Asaoka et al. |
| 6,456,234 B1 | 9/2002 | Johnson |
| 6,529,136 B2 | 3/2003 | Cao et al. |
| 6,539,232 B2 | 3/2003 | Hendrey et al. |
| 6,542,750 B2 | 4/2003 | Hendrey et al. |
| 6,618,593 B1 | 9/2003 | Drutman et al. |
| 6,675,015 B1 | 1/2004 | Martini et al. |
| 6,675,268 B1 | 1/2004 | DeKoning et al. |
| 6,708,172 B1 | 3/2004 | Wong et al. |
| 6,819,919 B1 | 11/2004 | Tanaka |
| 6,853,841 B1 | 2/2005 | St. Pierre |
| 6,876,642 B1 | 4/2005 | Adams et al. |
| 6,937,860 B2 | 8/2005 | Jahn |
| 6,947,571 B1 | 9/2005 | Rhoads et al. |
| 6,954,443 B2 | 10/2005 | Forstadius et al. |
| 6,968,179 B1 | 11/2005 | De Vries |
| 6,970,703 B2 | 11/2005 | Fuchs et al. |
| 6,975,266 B2 | 12/2005 | Abraham et al. |
| 6,987,885 B2 | 1/2006 | Gonzalez-Banos et al. |
| 6,990,497 B2 | 1/2006 | O'Rourke et al. |
| 7,020,710 B2 | 3/2006 | Weber et al. |
| 7,035,618 B2 | 4/2006 | Schnurr |
| 7,035,912 B2 | 4/2006 | Arteaga |
| 7,047,315 B1 | 5/2006 | Srivastava |
| 7,085,571 B2 | 8/2006 | Kalhan et al. |
| 7,116,985 B2 | 10/2006 | Wilson et al. |
| 7,123,918 B1 | 10/2006 | Goodman |
| 7,134,040 B2 | 11/2006 | Ayres |
| 7,171,018 B2 | 1/2007 | Rhoads et al. |
| 7,200,638 B2 | 4/2007 | Lake |
| 7,203,753 B2 | 4/2007 | Yeager et al. |
| 7,206,568 B2 | 4/2007 | Sudit |
| 7,218,611 B2 | 5/2007 | Mimura et al. |
| 7,236,739 B2 | 6/2007 | Chang |
| 7,240,106 B2 | 7/2007 | Cochran et al. |
| 7,247,024 B2 | 7/2007 | Bright et al. |
| 7,249,367 B2 | 7/2007 | Bove, Jr. et al. |
| 7,260,638 B2 | 8/2007 | Crosbie |
| 7,269,854 B2 | 9/2007 | Simmons et al. |
| 7,272,357 B2 | 9/2007 | Nishiga et al. |
| 7,319,379 B1 | 1/2008 | Melvin |
| 7,340,768 B2 | 3/2008 | Rosenberger |
| 7,343,160 B2 | 3/2008 | Morton |
| 7,359,894 B1 | 4/2008 | Liebman et al. |
| 7,373,109 B2 | 5/2008 | Pohja et al. |
| 7,398,081 B2 | 7/2008 | Moran |
| 7,423,580 B2 | 9/2008 | Markhovsky et al. |
| 7,509,131 B2 | 3/2009 | Krumm et al. |
| 7,512,702 B1 | 3/2009 | Srivastava et al. |
| 7,516,212 B2 | 4/2009 | Nguyen et al. |
| 7,558,404 B2 | 7/2009 | Ma et al. |
| 7,620,404 B2 | 11/2009 | Chesnais et al. |
| 7,668,832 B2 | 2/2010 | Yeh et al. |
| 7,684,815 B2 | 3/2010 | Counts et al. |
| 7,787,886 B2 | 8/2010 | Markhovsky et al. |
| 8,010,601 B2 | 8/2011 | Jennings et al. |
| 2001/0013009 A1 | 8/2001 | Greening et al. |
| 2001/0039659 A1 | 11/2001 | Simmons et al. |
| 2001/0048449 A1 | 12/2001 | Baker |
| 2002/0019829 A1 | 2/2002 | Shapiro |
| 2002/0049690 A1 | 4/2002 | Takano |
| 2002/0086659 A1 | 7/2002 | Lauper |
| 2002/0086676 A1 | 7/2002 | Hendrey et al. |
| 2003/0022675 A1 | 1/2003 | Mergler |
| 2003/0050062 A1 | 3/2003 | Chen et al. |
| 2003/0065721 A1 | 4/2003 | Roskind |
| 2003/0229549 A1 | 12/2003 | Wolinsky et al. |
| 2004/0009750 A1 | 1/2004 | Beros et al. |
| 2004/0024912 A1 | 2/2004 | Fukao et al. |
| 2004/0025185 A1 | 2/2004 | Goci et al. |
| 2004/0103280 A1 | 5/2004 | Balfanz et al. |
| 2004/0107219 A1 | 6/2004 | Rosenberger |
| 2004/0148393 A1 | 7/2004 | Breiter et al. |
| 2004/0160307 A1 | 8/2004 | Saikkonen et al. |
| 2004/0192331 A1 | 9/2004 | Gorday et al. |
| 2004/0225519 A1 | 11/2004 | Martin |
| 2005/0015800 A1 | 1/2005 | Holcomb |
| 2005/0021369 A1 | 1/2005 | Cohen et al. |
| 2005/0025320 A1 | 2/2005 | Barry |
| 2005/0033780 A1 | 2/2005 | Simelius et al. |
| 2005/0038876 A1 | 2/2005 | Chaudhuri |
| 2005/0050027 A1 | 3/2005 | Yeh et al. |
| 2005/0059379 A1 | 3/2005 | Sovio et al. |
| 2005/0060350 A1 | 3/2005 | Baum et al. |
| 2005/0070298 A1 | 3/2005 | Caspi et al. |
| 2005/0071221 A1 | 3/2005 | Selby |
| 2005/0160270 A1 | 7/2005 | Goldberg et al. |
| 2005/0174975 A1 | 8/2005 | Mgrdechian et al. |
| 2005/0197846 A1 | 9/2005 | Pezaris et al. |
| 2005/0210387 A1 | 9/2005 | Alagappan et al. |
| 2005/0231425 A1 | 10/2005 | Coleman et al. |
| 2005/0245233 A1 | 11/2005 | Anderson |
| 2005/0251453 A1 | 11/2005 | Lu |
| 2005/0251565 A1 | 11/2005 | Weel |
| 2005/0251566 A1 | 11/2005 | Weel |
| 2005/0251576 A1 | 11/2005 | Weel |
| 2005/0251807 A1 | 11/2005 | Weel |
| 2005/0272413 A1 | 12/2005 | Bourne |
| 2006/0085419 A1 | 4/2006 | Rosen |
| 2006/0085821 A9 | 4/2006 | Simmons et al. |
| 2006/0123080 A1 | 6/2006 | Baudino et al. |
| 2006/0149628 A1 | 7/2006 | Chefalas et al. |
| 2006/0149631 A1 | 7/2006 | Brazell et al. |
| 2006/0161599 A1 | 7/2006 | Rosen |
| 2006/0166679 A1 | 7/2006 | Karaoguz et al. |
| 2006/0168264 A1 | 7/2006 | Baba et al. |
| 2006/0218225 A1 | 9/2006 | Hee Voon et al. |
| 2006/0223518 A1 | 10/2006 | Haney |
| 2006/0229939 A1 | 10/2006 | Bhakta et al. |
| 2006/0240856 A1 | 10/2006 | Counts et al. |
| 2006/0256959 A1 | 11/2006 | Hymes |
| 2006/0270419 A1 | 11/2006 | Crowley et al. |
| 2006/0287915 A1 | 12/2006 | Boulet et al. |
| 2007/0005419 A1 | 1/2007 | Horvitz et al. |
| 2007/0015518 A1 | 1/2007 | Winter et al. |
| 2007/0030824 A1 | 2/2007 | Ribaudo et al. |
| 2007/0032242 A1 | 2/2007 | Goodman |
| 2007/0075898 A1 | 4/2007 | Markhovsky et al. |
| 2007/0121843 A1 | 5/2007 | Atazky et al. |
| 2007/0135138 A1 | 6/2007 | Brown et al. |
| 2007/0136132 A1 | 6/2007 | Weiser et al. |
| 2007/0142065 A1 | 6/2007 | Richey et al. |
| 2007/0167174 A1 | 7/2007 | Halcrow et al. |
| 2007/0168254 A1 | 7/2007 | Steelberg et al. |
| 2007/0174243 A1 | 7/2007 | Fritz |
| 2007/0203644 A1 | 8/2007 | Thota et al. |
| 2007/0205276 A1 | 9/2007 | Sodan et al. |
| 2007/0218867 A1 | 9/2007 | Mononen et al. |
| 2007/0218900 A1 | 9/2007 | Abhyanker |
| 2007/0249327 A1 | 10/2007 | Nurmi |
| 2007/0255785 A1 | 11/2007 | Hayashi et al. |
| 2007/0260508 A1 | 11/2007 | Barry et al. |
| 2007/0271136 A1 | 11/2007 | Strauss et al. |
| 2007/0282621 A1 | 12/2007 | Altman et al. |
| 2008/0016018 A1 | 1/2008 | Malik |
| 2008/0016205 A1 | 1/2008 | Svendsen |
| 2008/0033809 A1 | 2/2008 | Black et al. |
| 2008/0076418 A1 | 3/2008 | Beyer, Jr. |
| 2008/0086741 A1 | 4/2008 | Feldman et al. |
| 2008/0097999 A1 | 4/2008 | Horan |
| 2008/0106599 A1 | 5/2008 | Liu et al. |
| 2008/0118106 A1 | 5/2008 | Kilambi et al. |
| 2008/0133759 A1 | 6/2008 | Weel |
| 2008/0140650 A1 | 6/2008 | Stackpole |
| 2008/0155080 A1 | 6/2008 | Marlow et al. |

(56) References Cited

U.S. PATENT DOCUMENTS

| | | |
|---|---|---|
| 2008/0182563 A1 | 7/2008 | Wugofski et al. |
| 2008/0182591 A1 | 7/2008 | Krikorian |
| 2008/0188261 A1 | 8/2008 | Arnone |
| 2008/0222295 A1 | 9/2008 | Robinson et al. |
| 2008/0227473 A1 | 9/2008 | Haney |
| 2008/0250312 A1 | 10/2008 | Curtis |
| 2008/0288375 A1 | 11/2008 | Uhrig et al. |
| 2008/0306826 A1 | 12/2008 | Kramer et al. |
| 2009/0023410 A1 | 1/2009 | Ghosh |
| 2009/0024315 A1 | 1/2009 | Scheibe |
| 2009/0030999 A1 | 1/2009 | Gatzke et al. |
| 2009/0047972 A1 | 2/2009 | Neeraj |
| 2009/0055229 A1 | 2/2009 | Lidgren et al. |
| 2009/0076894 A1 | 3/2009 | Bates et al. |
| 2009/0082038 A1 | 3/2009 | McKiou et al. |
| 2009/0112467 A1 | 4/2009 | Jiang et al. |
| 2009/0115570 A1 | 5/2009 | Cusack, Jr. |
| 2009/0132652 A1 | 5/2009 | Athale et al. |
| 2009/0144211 A1 | 6/2009 | O'Sullivan et al. |
| 2009/0156160 A1 | 6/2009 | Evans et al. |
| 2009/0164431 A1 | 6/2009 | Zivkovic et al. |
| 2009/0164459 A1 | 6/2009 | Jennings et al. |
| 2009/0164574 A1 | 6/2009 | Hoffman |
| 2011/0136506 A1 | 6/2011 | Stewart |

FOREIGN PATENT DOCUMENTS

| | | |
|---|---|---|
| WO | WO 99/05877 | 2/1999 |
| WO | WO 00/03830 | 1/2000 |
| WO | WO 01/24551 | 4/2001 |
| WO | WO 02/29506 | 4/2002 |
| WO | WO 02/062092 | 8/2002 |
| WO | WO 2006/082566 | 8/2006 |

OTHER PUBLICATIONS

"Apple—iPod classic," at <http://www.apple.com/ipodclassic/>, printed Oct. 26, 2007, 1 page.

"Bluetooth.com—Learn," http://www.bluetooth.com/Bluetooth/Learn/, copyright 2007 Bluetooth SIG, Inc., printed Oct. 26, 2007, 1 page.

"CitySense—Powered by Sense Networks," at <http://www.citysense.com/moreinfo.php>, copyright 2008, Sense Networks, printed Sep. 8, 2009, 2 pages.

"ConnectingCadence.com—Mapping the social world.," at <http://www.connectingcadence.com/>, found on the Internet Archive, copyright 2008, ConnectingCadence, printed Apr. 28, 2011, 1 page.

Benford, S. et al., "Crowded Collaborative Virtual Environments," Proceedings of the SIGCHI Conference on Human Factors in Computing Systems, Atlanta, Georgia, Mar. 22-27, 1997, 7 pages.

"Dating Service—Singles, Personals and Love, Match.com," http://www.match.com/, copyright 2008 Match.com, printed Jan. 16, 2008, 2 pages.

"dodgeball.com :: mobile social software," at <http://www.dodgeball.com/>, copyright 2008, Google Inc., printed Jan. 16, 2008, 1 page.

Ngai, Wang Kay et al., "Efficient Clustering of Uncertain Data," Proceedings of the Sixth International Conference on Data Mining (ICDM'06), Dec. 18-22, 2006, pp. 436-445, copyright 2006, IEEE, 10 pages.

"eHarmony," http://eharmony.com/, copyright 2000-2008 eHarmony.com, printed Jan. 16, 2008, 1 page.

Ertoz, L. et al., "Finding Clusters of Different Sizes, Shapes, and Densities in Noisy, High Dimensional Data," Proceedings of the 2003 SIAM International Conference on Data Mining (SDM 2003), Jan. 24, 2003, pp. 47-58, San Francisco, CA, 12 pages.

"Fire Eagle," at <http://fireeagle.yahoo.net>, copyright 2007-2011, Yahoo! Inc., printed Apr. 28, 2011, 2 pages.

"flickr," http://www.flickr.com/, copyright 2008 Yahoo! Inc., printed Jan. 16, 2008, 1 page.

"Friendster—Home," http://www.friendster.com/, copyright 2002-2007 Friendster, Inc., printed Jan. 16, 2008, 1 page.

"Google AdWords: Regional and Local Targeting," https://adwords.google.com/select/targeting.html, copyright 2008 Google, printed Jul. 17, 2008, 1 page.

"Google Talk," http://www.google.com/talk/, copyright 2008 Google, printed Jan. 16, 2008, 1 page.

"iChat. Not being there is half the fun," http://www.apple.com/macosx/features/ichat.html, printed Jan. 16, 2008, 1 page.

"icq," http://www.icq.com/, copyright 1998-2008 ICQ Inc., printed Jan. 16, 2008, 2 pages.

"IEEE 802.11—Wlkipedia, the free encyclopedia," http://en.wikipedia.org/wiki/IEEE_802.11, printed Oct. 26, 2007, 5 pages.

"Instant Messenger—AIM—Instant Message Your Online Buddies for Free—AIM," http://dashboard.aim.com/aim, copyright 2007 AOL LLC, printed Nov. 8, 2007, 6 pages.

"Internet Relay Chat—Wikipedia, the free encyclopedia," http://en.wikipedia.org/wiki/IRC, printed Nov. 16, 2007, 11 pages.

"IP Multimedia Subsystem," http://en.wikipedia.org/wiki/IP_Multimedia_Subsystem, printed Jul. 8, 2009, 11 pages.

Estrin, M., "Is the MySpace crowd lying to marketers?", Oct. 16, 2007, posted at iMedia Connection, at <http://www.imediaconnection.com/content/16993.asp>, copyrighted by iMedia Communications, Inc., printed Apr. 28, 2011, 2 pages.

"Jabber SoftwareFoundation," http://www.jabber.org/, copyright 1999-2005 the Jabber Software Foundation, printed Jan. 16, 2008, 3 pages.

"MobiClique," copyright 2007-2009, Thomson, originally found at <http://www.thlab.net/~apietila/mobiclique/>, printed Oct. 23, 2009, 5 pages.

"Mobile community, free sms, mobile dating, text flirting and friends networking—playtxt . . . ," http://web.archive.org/web/20070225125113rn_1/www.playtxt.net/Playtxt.do, printed Jan. 16, 2008, 1 page.

"MySpace," at <http://www.myspace.com/>, copyright 2003-2008, MySpace.com, printed Jan. 16, 2008, 2 pages.

"Online adult dating service and personals—Lavalife—Where Singles Click," at <http://lavalife.com/>, copyright 2006, Lavalife Corp., printed Jan. 16, 2008, 1 page.

Hardt, D. et al., "OpenID Attribute Exchange 1.0—Final," at <http://openid.net/specs/openid-attribute-exchange-1_0.html>, Dec. 5, 2007, 11 pages.

"OpenID Foundation website," at <http://openid.net>, copyright 2006-2011, OpenID Foundation, printed Apr. 28, 2011, 2 pages.

Quinn, M. et al., "Parallel Implementation of the Social Forces Model," Proceedings of the Second International Conference in Pedestrian and Evacuation Dynamics, Greenwich, England, 2003, pp. 63-74, found at <http://web.engr.oregonstate.edu/~metoyer/docs/parallelPeds.pdf>, 12 pages.

Cox, L.P. et al., "Presence-Exchanges: Toward Sustainable Presence-Sharing," In Proc. of 7th IEEE Workshop on Mobile Computing Systems and Applications, Apr. 6-7, 2006, Semiahmoo Resort, Washington, pp. 55â€"60, 6 pages.

"Rabble—Social networking for your phone," http://www.rabble.com/, copyright 2005-2008 Intercasting Corp., printed Jan. 16, 2008, 1 page.

Abstract, "Self-Organized Pedestrian Crowd Dynamics: Experiments, Simulations, and Design Solutions," by Helbing, D. et al., Transportation Science, vol. 39, Issue 1, Feb. 2005, obtained from ACM Digital Library at <http://portal.acm.org/citation.cfm?id=1247227>, printed Apr. 28, 2011, 2 pages.

"Sense Networks," at <http://www.sensenetworks.com/about_us.php>, copyright 2008-2010, Sense Networks, printed Apr. 28, 2011, 1 page.

"Six degrees of separation," at <http://en.wikipedia.org/wiki/Six_degrees_of_separation>, last modified on Apr. 19, 2011,printed Apr. 28, 2011, 11 pages.

"SmallPlanet: Home," http://web.archive.org/web/20061105030323/http://www.smallplanet.net/, copyright 2005 SmallPlanet.net, printed Jan. 16, 2008, 1 page.

Cox et al., "SmokeScreen: Flexible Privacy Controls for Presence-Sharing," Proceedings of the 5th International Conference on Mobile

(56) References Cited

OTHER PUBLICATIONS

Systems, Applications, and Services (2007) (MobiSys '07), Jun. 11-13, 2007, San Juan, Puerto Rico, 13 pages.

"Technology—Geo Targeting," http://www.invidi.com/pages/itc_technology_05.html, copyright 2007, printed Nov. 18, 2008, 1 page.

"What is LinkedIn?," at <http://www.linkedin.com/static?key=what_is_linkedin&trk=hb_what>, copyright 2011, LinkedIn Corporation, printed Apr. 28, 2011, 1 page.

"Windows Live Messenger—Overview," http://get.live.com/messenger/overview, copyright 2007 Microsoft Corp., printed Nov. 28, 2007, 1 page.

"Yahoo! Messenger—Chat, Instant message, SMS, PC Calls and More," http://messenger.yahoo.com/webmessengerpromo.php, copyright 2007 Yahoo! Inc., printed Oct. 26, 2007, 1 page.

"Yahoo! Personals," http://personals.yahoo.com/us/homepage/splash, copyright 2008 Yahoo! Inc., printed Jan. 16, 2008, 2 pages.

"Zune," http://www.zune.net/en-US/, copyright 2008 Microsoft Corporation, printed Jan. 16, 2008, 1 page.

CONTIGUOUS LOCATION-BASED USER NETWORKS

RELATED APPLICATIONS

This patent application is a continuation of U.S. patent application Ser. No. 13/036,389, filed Feb. 28, 2011, entitled "CONTIGUOUS LOCATION-BASED USER NETWORKS," which is a continuation of U.S. patent application Ser. No. 12/013,186, filed Jan. 11, 2008, entitled "CONTIGUOUS LOCATION-BASED USER NETWORKS," which claims the benefit of provisional patent application Ser. No. 61/016,084, filed Dec. 21, 2007, the disclosures of which are hereby incorporated by reference in their entireties.

FIELD OF THE INVENTION

The present invention relates to location-based user networks.

BACKGROUND OF THE INVENTION

In today's digital world there are various types of user networks. A user network may be, for example, a social network formed on online social networking websites such as MySpace, a contacts list in a communications application such as an email application or an instant messaging application, a digital content sharing network such as a photo sharing network or a music sharing network, or the like. Other user networks may be, for example, location-based ad-hoc networks. Regardless of the type of user network, it is often desirable to identify new users to add to the user network. Thus, there is a need for a system and method for identifying new users for a user network.

SUMMARY OF THE INVENTION

The present invention provides a system and method for creating location-based user networks. In general, a proximity group including a number of users is identified. Each user in the proximity group is within a proximate area of at least one other user in the proximity group and has an area of interest. Both the proximate area and the area of interest of a user are geographic areas, wherein the area of interest is larger than the proximate area. The areas of interest of the users in the proximity group are aggregated to provide an aggregate area of interest for the proximity group. Other users within the aggregate area of interest are identified as neighbors of each of the users in the proximity group. Once the neighbors are identified, each of the users in the proximity group may use the neighbors as members, or potential members, for a user network.

For example, assume that the proximity group includes a first user and a second user. The first user has a first proximate area in which the second user is located and a first area of interest. The second user has a second proximate area in which the first user is located and a second area of interest. Additional users within the aggregate of the first and second areas of interest are identified as neighbors of both the first and second user. As a result, the first and second areas of interest of the first and second users are effectively expanded. More specifically, additional users outside the first area of interest but within the second area of interest are identified as neighbors of both the first and second users. Likewise, additional users outside the second area of interest but within the first area of interest are identified as neighbors of both the first and second users. Additional users within both the first and second areas of interest are also identified as neighbors of both the first and second users.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
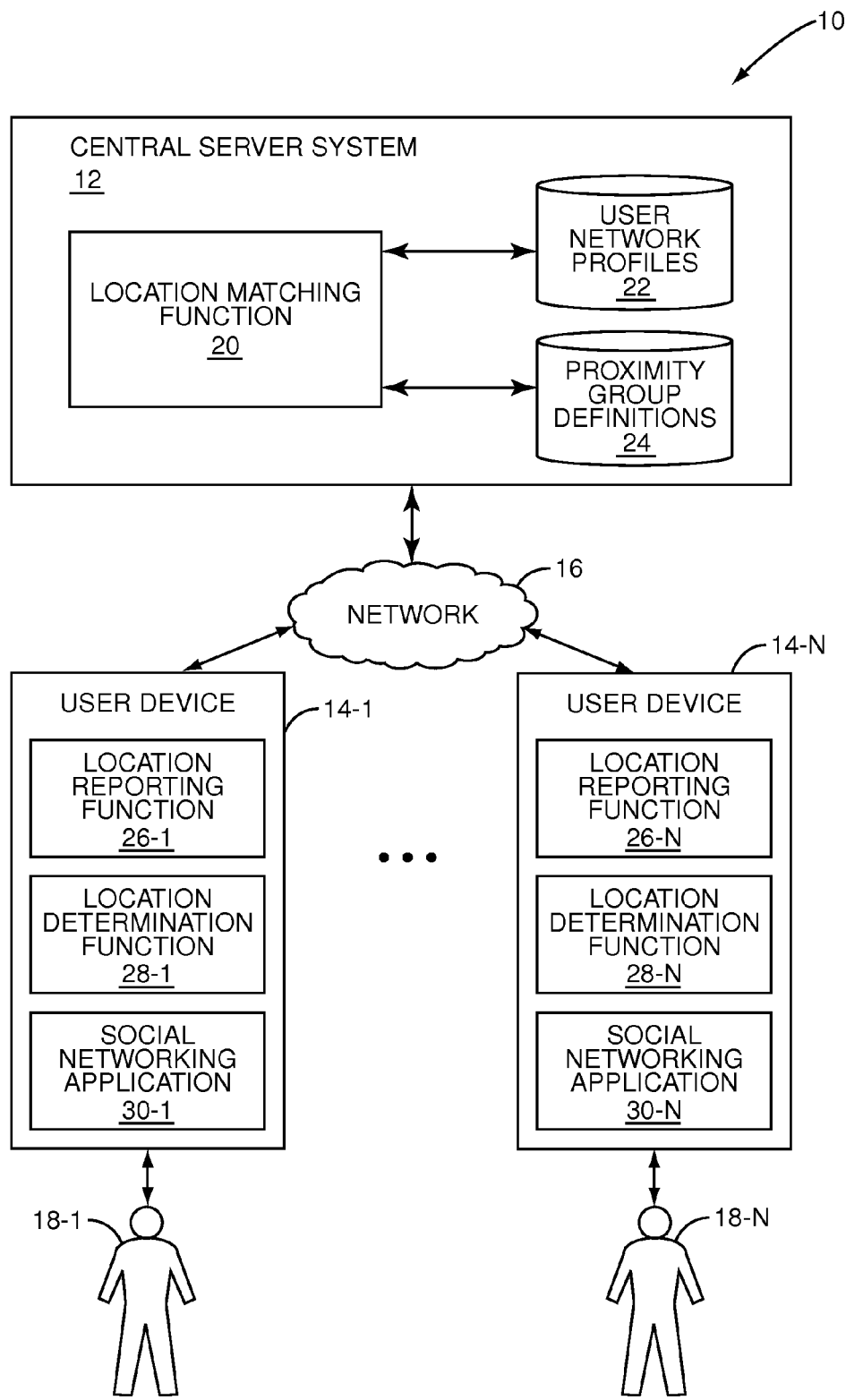
FIG. 1 illustrates an exemplary system for identifying users for location-based user networks.

FIG. 1 illustrates an exemplary system 10 for creating location-based user networks according to one embodiment of the present invention. In general, the system 10 includes a central server system 12 and a number of user devices 14-1 through 14-N communicatively coupled via a network 16. The network 16 may be any type or combination of Wide Area Network (WAN) or Local Area Network (LAN). For example, the network 16 may be the Internet. Further, the network 16 may include wired components, wireless components, or both wired and wireless components. The user devices 14-1 through 14-N are associated with corresponding users 18-1 through 18-N.

The central server system 12 may be implemented as a single server or as multiple servers operating in a collaborative manner. The central server system 12 includes a location matching function 20 and stores or otherwise has access to user network profiles 22 for the users 18-1 through 18-N and, in this embodiment, proximity group definitions 24. The location matching function 20 is preferably implemented in software. However, the present invention is not limited thereto. The location matching function 20 may be implemented in software, hardware, or a combination thereof.

The user network profiles 22 include a user network profile for each of the users 18-1 through 18-N. Using the user 18-1 as an example, the corresponding user network profile 22 includes: (1) information identifying the user 18-1, (2) information identifying a current location of the user 18-1, (3) information defining an Area of Interest (AOI) of the user 18-1, (4) optionally, information defining a proximate area for the user 18-1, (5) a list of neighbors of the user 18-1, and (6) information identifying or referring to a proximity group definition 24 for a proximity group of which the user 18-1 is a member, if any. The information identifying the user 18-1 may be any type of identification information such as, for example, a user identifier (ID), name, email address, or the like. The information identifying the current location of the user 18-1 may be, for example, coordinates obtained from the Global Positioning System (GPS) or any other type of information capable of identifying the location of the user 18-1.

The AOI of the user 18-1 is generally a geographical area surrounding the user 18-1. As such, the information identifying the AOI of the user 18-1 may be any type of system-defined or user-defined information defining or otherwise identifying a geographic area. For example, the AOI of the user 18-1 may be a circular area where the information defining the AOI of the user 18-1 is a system-defined or user-defined radius from the current location of the user 18-1. Similarly, the proximate area of the user 18-1 is a geographical area surrounding the user 18-1 that is typically substantially smaller than the AOI of the user 18-1. However, the size of the proximate area of the user 18-1 may be any size less than or equal to the size of the AOI of the user 18-1. As such, the information identifying the proximate area of the user 18-1 may be any type of system-defined or user-defined information defining or otherwise identifying a geographical area. For example, the information defining the proximate area of the user 18-1 may be a radius from the current location of the user 18-1, a maximum response time to the user 18-1, or the like. Note that the exemplary information defining the AOI and proximate area of the user 18-1 are for illustrative purposes only and not intended to limit the scope of the present invention. Numerous variations will be apparent to one of ordinary skill in the art upon reading this disclosure.

The list of neighbors of the user 18-1 is a list identifying other users from the users 18-2 through 18-N that are within the AOI of the user 18-1. The information identifying the proximity group of which the user 18-1 is a member is information referencing or otherwise identifying a proximity group definition 24 for a proximity group of which the user 18-1 is a member. As discussed below, the user 18-1 may or may not be a member of a proximity group. If the user 18-1 is a member of a proximity group, the proximity group of the user 18-1 includes the user 18-1 and a number of proximate neighbors of the user 18-1, where the proximate neighbors of the user 18-1 are other users from the user 18-2 through 18-N that are within the proximate area of the user 18-1. In addition, the proximity group may include second level proximate neighbors that are proximate to the proximate neighbors of the user 18-1, a third level of proximate neighbors that are proximate to the second level proximate neighbors, and so on. As discussed below, the proximity group is used to expand the AOI of the user 18-1, as well as the AOIs of the other members of the proximity group, to an aggregate of the AOIs of the members of the proximity group. As a result, the neighbors of each member of the proximity group become neighbors of all other members of the proximity group.

The proximity group definitions 24 include a proximity group definition 24 for each of a number of proximity groups. As discussed below, a proximity group is a group of two or more of the users 18-1 through 18-N, where each user in the proximity group is within the proximate area of at least one other user in the proximity group. The users in a proximity group are referred to herein as members of the proximity group. Each member of a proximity group is a proximate neighbor of at least one other member of the proximity group. Thus, using user 18-1 as an example, a proximity group including the user 18-1 would include the user 18-1 and one or more other users from the users 18-2 through 18-N that are proximate to the user 18-1. In addition, the proximity group may include other users from the users 18-2 through 18-N that are proximate neighbors of the proximate neighbors of the user 18-1. Thus, assuming that the user 18-2 is a proximate neighbor of the user 18-1, the proximity group of the user 18-1 would include the user 18-1 and the user 18-2. Then, if the user 18-3 is a proximate neighbor of the user 18-2 but not the user 18-1, the proximity group would further include the user 18-3. The proximity group may also include the proximate neighbors of the user 18-3, the proximate neighbors of the proximate neighbors of the proximate neighbors of the user 18-3, and so on.

In addition to a list of the members of the proximity group, the proximity group definition 24 for the proximity group includes an aggregate neighbors list. The aggregate neighbors list is an aggregate list of the neighbors of all of the members of the proximity group. Thus, if the proximity group includes the users 18-1 through 18-3, the aggregate neighbors list is an aggregate of the neighbors of the user 18-1, the neighbors of the user 18-2, and the neighbors of the user 18-3. The aggregate neighbors list preferably does not include duplicates.

The user devices 14-1 through 14-N include location reporting functions 26-1 through 26-N, location determination functions 28-1 through 28-N, and social networking applications 30-1 through 30-N, respectively. The following discussion is focused on the user device 14-1. However, the discussion is equally applicable to the other user devices 14-2 through 14-N. The location reporting function 26-1 may be implemented in software, hardware, or a combination thereof. The location reporting function 26-1 operates to report a location of the user device 14-1, and thus a location of the user 18-1, to the central server system 12. The location of the user device 14-1 may be reported periodically, reported when requested or polled by the central server system 12, or reported in response to a change in the location of the user device 14-1.

The location determination function 28-1 may be implemented in software, hardware, or a combination thereof. In one embodiment, the location determination function 28-1 is a GPS receiver. However, the present invention is not limited thereto. The location determination function 28-1 may determine the location of the user device 14-1 using any known technique. For example, the location determination function 28-1 may operate to receive the location of the user device 14-1 from an associated mobile telecommunications network, which may use a technique such as triangulation to determine a location of the user device 14-1. The location determination function 28-1 may report the location of the user device 14-1 to the location reporting function 26-1.

Alternatively, the location reporting function 26-1 may query the location determination function 28-1 when needed or desired.

The social networking application 30-1 is preferably implemented in software. However, the present invention is not limited thereto. The social networking application 30-1 may be any type of application that leverages or uses a network of users. For example, the social networking application 30-1 may be a social recommendation system such as that disclosed in commonly owned and assigned U.S. patent application Ser. No. 11/484,130, entitled P2P NETWORK FOR PROVIDING REAL TIME MEDIA RECOMMENDATIONS, which was filed on Jul. 11, 2006 and is hereby incorporated herein by reference in its entirety. As another example, the social networking application 30-1 may be a text-based or voice-based chat or messaging application maintaining a buddy list or similar user network. As a final example, the social networking application 30-1 may be a media content sharing system where users form a user network for sharing media content such as videos, songs, previews of songs, or the like. For example, the social networking application 30-1 may enable the user device 14-1 to broadcast or otherwise share music with other user devices from the user devices 14-2 through 14-N associated with other users in the social network of the user 18-1.

As discussed below, the location matching function 20 operates to identify neighbors for each of the users 18-1 through 18-N. Using the user 18-1 as an example, the neighbors of the user 18-1 include other users from the users 18-2 through 18-N that are located within the AOI of the user 18-1. In addition, if the user 18-1 is a member of a proximity group, the neighbors of the user 18-1 further include other users located within the AOIs of the other members of the proximity group. In one embodiment, the neighbors of the user 18-1 may be used as potential members of a user network for the user 18-1. Members for the user network of the user 18-1 may then be identified by using, for example, a manual process where the user 18-1 manually selects one or more of the neighbors of the user as a member of his or her user network. In addition or alternatively, an automated process such as user profile matching may be used to identify members for the user network of the user 18-1 from the neighbors of the user 18-1. User profile matching may use information such as demographic information, biographical information, user preferences such as preferred music genres or artists, or the like in order to select one or more of the neighbors of the user 18-1 as members of the user network of the user 18-1.

Figure 2:
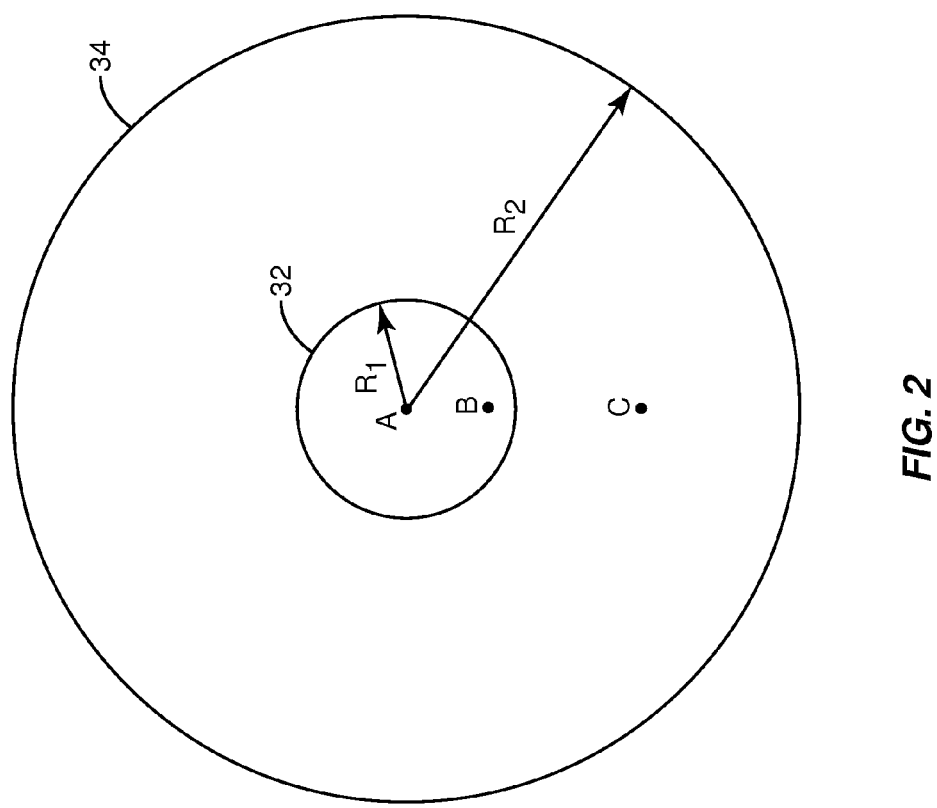
FIG. 2 illustrates a user having an associated proximate area and an associated area of interest (AOI) according to one embodiment of the present invention.

FIGS. 2 through 8 graphically depict the operation of the location matching function 20 according to one embodiment of the present invention. In FIGS. 2 through 8, the users 18-1 through 18-N are indicated by letters A, B, C, etc. FIG. 2 illustrates a proximate area 32 and an AOI 34 of a user A. In this example, the proximate area 32 is defined by a first radius $R_1$, and the AOI 34 is defined by a second radius $R_2$. Note that the proximate area 32 is substantially smaller than the AOI 34. For example, the proximate area 32 may be 25% of the AOI 34. However, the present invention is not limited thereto. Also note that the proximate area 32 may be system-defined or user-defined. Likewise, the AOI 34 may be system-defined or user-defined. A user B is located within the proximate area 32 of the user A and is therefore referred to herein as a proximate neighbor of the user A. The user B is also said to be proximate to the user A. A user C is not within the proximate area 32 of the user A but is within the AOI 34 of the user A. As such, the user C is referred to herein as a neighbor of the user A. Note that the user B is both a proximate neighbor of the user A and a neighbor of the user A.

Figure 3:
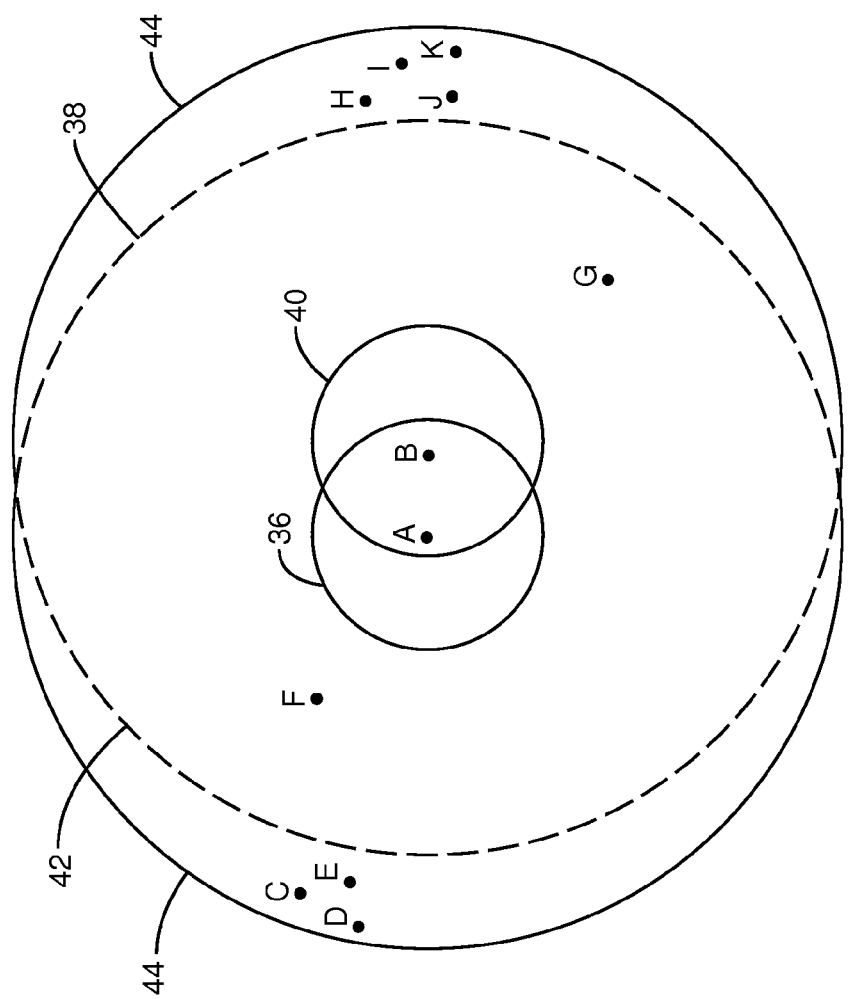
FIG. 3 illustrates the creation of a proximity group and the aggregation of the AOIs of the members of the proximity group according to one embodiment of the present invention.

FIG. 3 illustrates the aggregation of the AOIs of two proximate neighbors according to one embodiment of the present invention. In this example, a user A has a proximate area 36 and an AOI 38. The user B is located within the proximate area 36 of the user A. The users B through G are located within the AOI 38 of the user A. The user B has a proximate area 40 and an AOI 42. The user A is located within the proximate area 40 of the user B. The users A, F, B, G, and H through K are located within the AOI 42 of the user B. Note that if the AOIs 38 and 42 of the users A and B, respectively, were not aggregated, the users C through E would not be neighbors of the user B and the users H through K would not be neighbors of the user A. Thus, even though users A and B are close to one another, they would have access to different users for their user networks. In order to expand the AOI 38 of the user A to cover the additional users H through K and to expand the AOI 42 of the user B to cover the additional users C through E, the AOIs 38 and 42 are aggregated to form an aggregate AOI 44, which is indicated by the solid line.

More specifically, in one embodiment, the AOIs 38 and 42 are aggregated by creating a proximity group for the users A and B. The users A and B are referred to herein as members of the proximity group. The neighbors of the users A and B are then aggregated to provide an aggregate neighbors list for the proximity group. Thus, in this example, the user A may have the following user network profile 22:

User A: ID
    Location: XX, YY
    Proximate Area: $R_1$
    AOI: $R_2$
    Neighbors: B, C, D, E, F, G
    Proximity Group: P0.

The user B may have the following user network profile 22:

User B: ID
    Location: XX, YY
    Proximate Area: $R_1$
    AOI: $R_2$
    Neighbors: A, F, G, H, I, J, K
    Proximity Group: P0.

Thus, the proximity group definition including the aggregate neighbors list may be:

Proximity Group: P0
    Members: A, B
    Aggregate Neighbors List: C, D, E, F, G, H, I, J, K.

Using the aggregate neighbors list, the users C through K are identified as neighbors of both the user A and the user B. In addition, the user B is a neighbor of the user A, and the user A is neighbor of the user B. By aggregating the neighbors of the users A and B, the AOIs 38 and 42 of the users A and B are effectively aggregated to provide the aggregate AOI 44. Note that the technique for aggregating the AOIs of the members of a proximity group discussed herein is exemplary and not intended to limit the scope of the present invention. Other techniques may be used.

Figure 4:
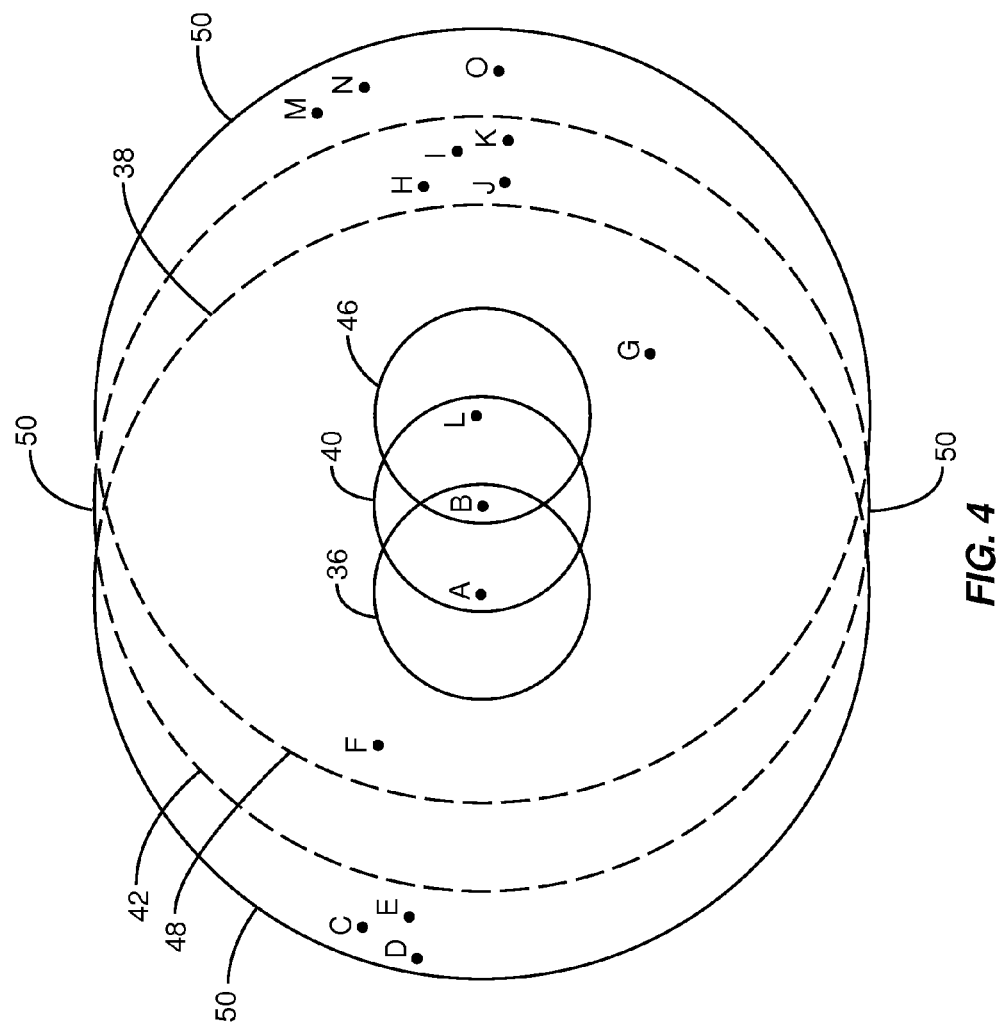
FIG. 4 illustrates the addition of a new user to the proximity group of FIG. 3 according to one embodiment of the present invention.

FIG. 4 illustrates the addition of a new member to the proximity group of FIG. 3 according to one embodiment of the present invention. More specifically, in this example, a user L enters the proximate area 40 of the user B. The user L has a proximate area 46 and an AOI 48. As a result of being proximate to the user B, the user L is added to the proximity group, and the neighbors of the user L are added to the aggregate neighbors list for the proximity group. Thus, continuing the example from above, the user A may have the following user network profile 22:

User A: ID
    Location: XX, YY
    Proximate Area: $R_1$

AOI: $R_2$
Neighbors: B, C, D, E, F, G, L
Proximity Group: P0.

The user B may have the following user network profile 22:
  User B: ID
  Location: XX, YY
  Proximate Area: $R_1$
  AOI: $R_2$
  Neighbors: A, F, G, H, I, J, K, L
  Proximity Group: P0.

The user L may have the following user network profile 22:
  User L: ID
  Location: XX, YY
  Proximate Area: $R_1$
  AOI: $R_2$
  Neighbors: A, B, F, G, H, I, J, K, M, N, O
  Proximity Group: P0.

Thus, the proximity group definition 24 including the aggregate neighbors list may be:
  Proximity Group: P0
  Members: A, B, L
  Aggregate Neighbors List: C, D, E, F, G, H, I, J, K, M, N, O.

Using the aggregate neighbors list, the users C through K and the users M through O are identified as neighbors of each of the users A, B, and L. In addition, the users B and L are neighbors of the user A, the users A and L are neighbors of the user B, and the users A and B are neighbors of the user L. By aggregating the neighbors of the users A, B, and L, the AOIs 38, 42, and 48 of the users A, B, and L are effectively aggregated to provide an aggregate AOI 50, which is indicated by a solid line.

Figure 5:
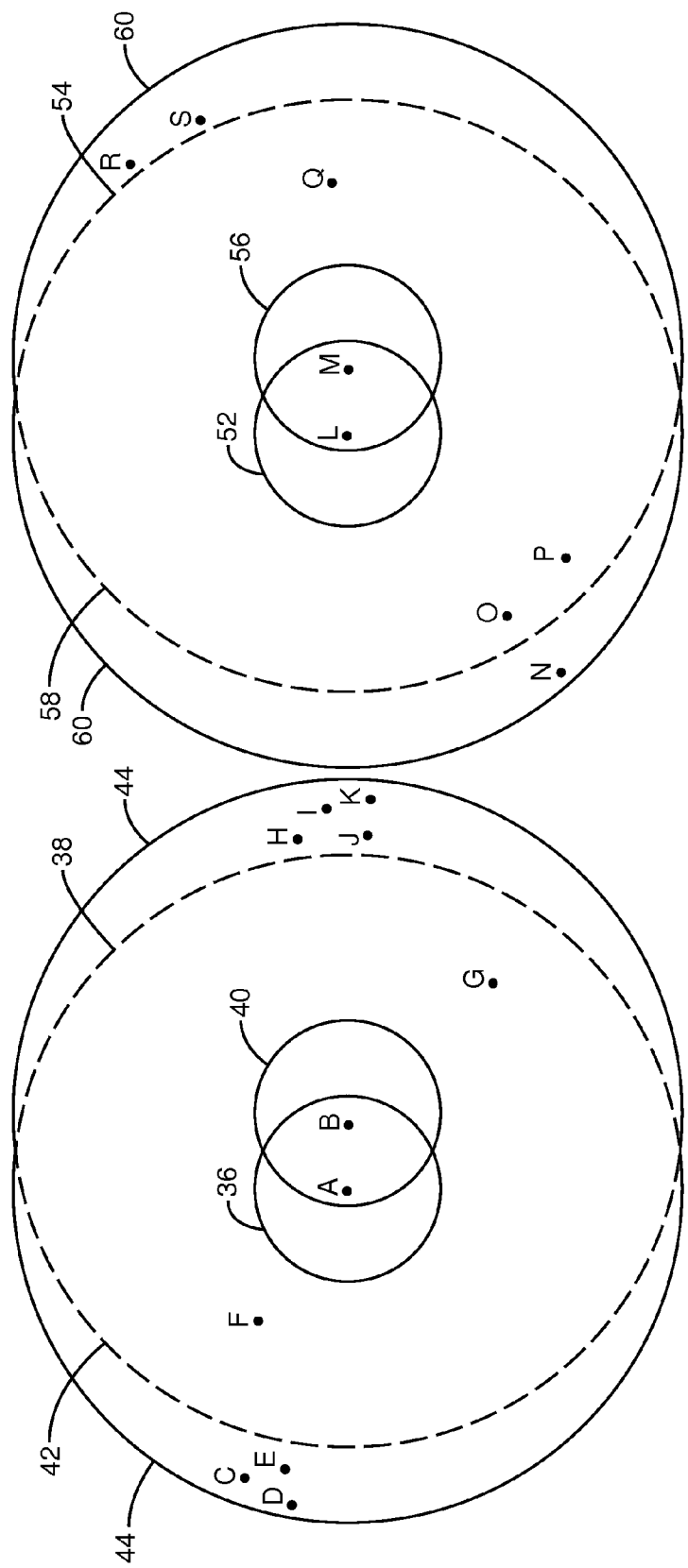
FIGS. 5 and 6 illustrate the merger of two proximity groups according to one embodiment of the present invention.
Figure 6:
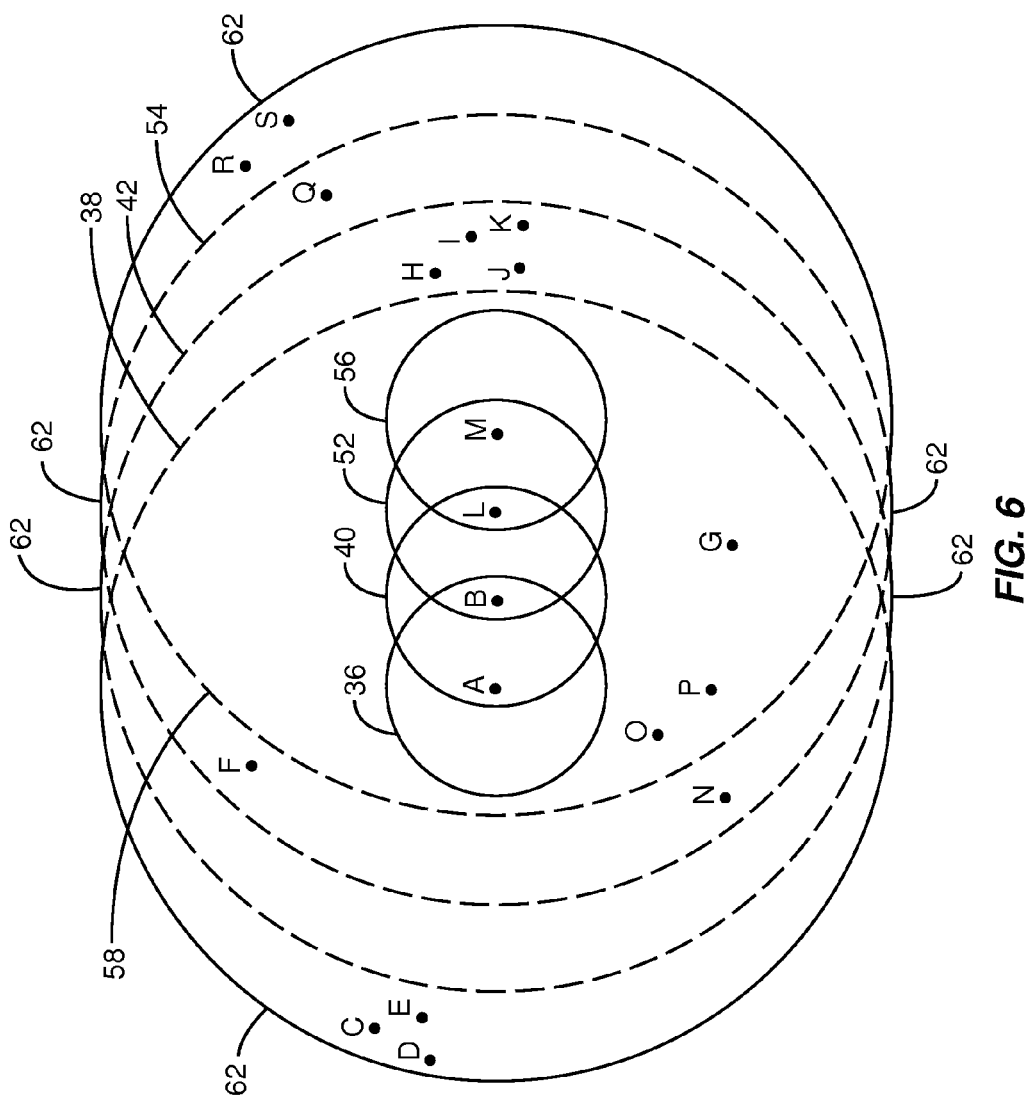

FIGS. 5 and 6 illustrate the merger of two proximity groups when a member of the first proximity group enters the proximate area of a member of the second proximity group according to one embodiment of the present invention. In this example, the users A and B are members of a first proximity group, as discussed above with respect to FIG. 3. Users L and M are proximate to one another and are therefore members of a second proximity group. The user L has a proximate area 52 and an AOI 54, and the user M has a proximate area 56 and an AOI 58. Users M through Q are neighbors of the user L. Users L, O, P, and Q through S are neighbors of the user M. As such, the users N through P and Q through S are included in an aggregate neighbors list for the second proximity group, thereby effectively aggregating the AOIs 54 and 58 of the users L and M to provide an aggregate AOI 60 for the second proximity group, which is indicated by a solid line.

FIG. 6 illustrates the merger of the first and second proximity groups when the user L enters the proximate area 40 of the user B. In order to merge the two proximity groups, a new proximity group is defined, or one of the previous proximity groups is modified, such that the users A, B, L, and M are the members of the new proximity group. The users C through K and N through S form the aggregate neighbors list for the new proximity group.

More specifically, in one embodiment, prior to the merger of the proximity groups, the user A may have the following user network profile 22:
  User A: ID
  Location: XX, YY
  Proximate Area: $R_1$
  AOI: $R_2$
  Neighbors: B, C, D, E, F, G
  Proximity Group: P0.

The user B may have the following user network profile 22:
  User B: ID
  Location: XX, YY
  Proximate Area: $R_1$
  AOI: $R_2$
  Neighbors: A, F, G, H, I, J, K
  Proximity Group: P0.

Thus, the first proximity group P0 may have the following proximity group definition:
  Proximity Group: P0
  Members: A, B
  Aggregate Neighbors List: C, D, E, F, G, H, I, J, K.

In a similar fashion, the user L may have the following user network profile 22:
  User L: ID
  Location: XX, YY
  Proximate Area: $R_1$
  AOI: $R_2$
  Neighbors: M, N, O, P, Q
  Proximity Group: P1.

The user M may have the following user network profile 22:
  User M: ID
  Location: XX, YY
  Proximate Area: $R_1$
  AOI: $R_2$
  Neighbors: L, O, P, Q, R, S
  Proximity Group: P1.

Thus, the second proximity group P1 may have the following proximity group definition:
  Proximity Group: P1
  Members: L, M
  Aggregate Neighbors List: N, O, P, Q, R, S.

After the merger of the first and second proximity groups, the user network profiles of the users A, B, L, and M reference the new proximity group definition, which in this case is proximity group P2. As a result of the merger, the new proximity group P2 may have the following proximity group definition:
  Proximity Group: P2
  Members: A, B, L, M
  Aggregate Neighbors List: C, D, E, F, G, H, I, J, K, N, O, P, Q, R, S.

Using the aggregate neighbors list, the users C through K and the users N through S are identified as neighbors of each of the users A, B, L, and M. In addition, the users B, L, and M are neighbors of the user A. The users A, L, and M are neighbors of the user B. The users A, B, and M are neighbors of the user L, and the users A, B, and L are neighbors of the user M. By aggregating the neighbors of the users A, B, L, and M, the AOIs 38, 42, 54, and 58 of the users A, B, L, and M are effectively aggregated to provide an aggregate AOI 62, which is indicated by a solid line.

Figure 7:
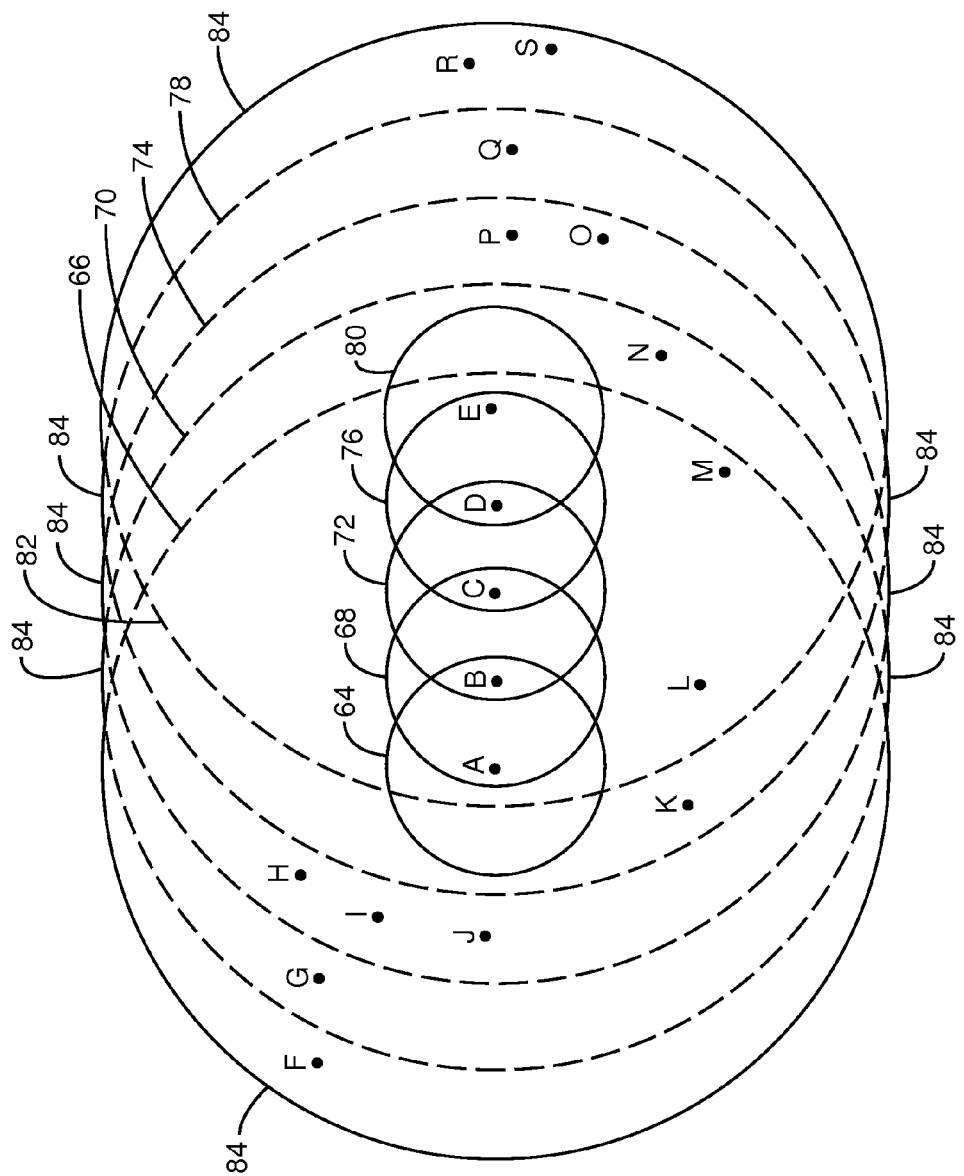
FIGS. 7 and 8 illustrate the severing of a proximity group in response to a user being removed from a proximity group according to one embodiment of the present invention.
Figure 8:
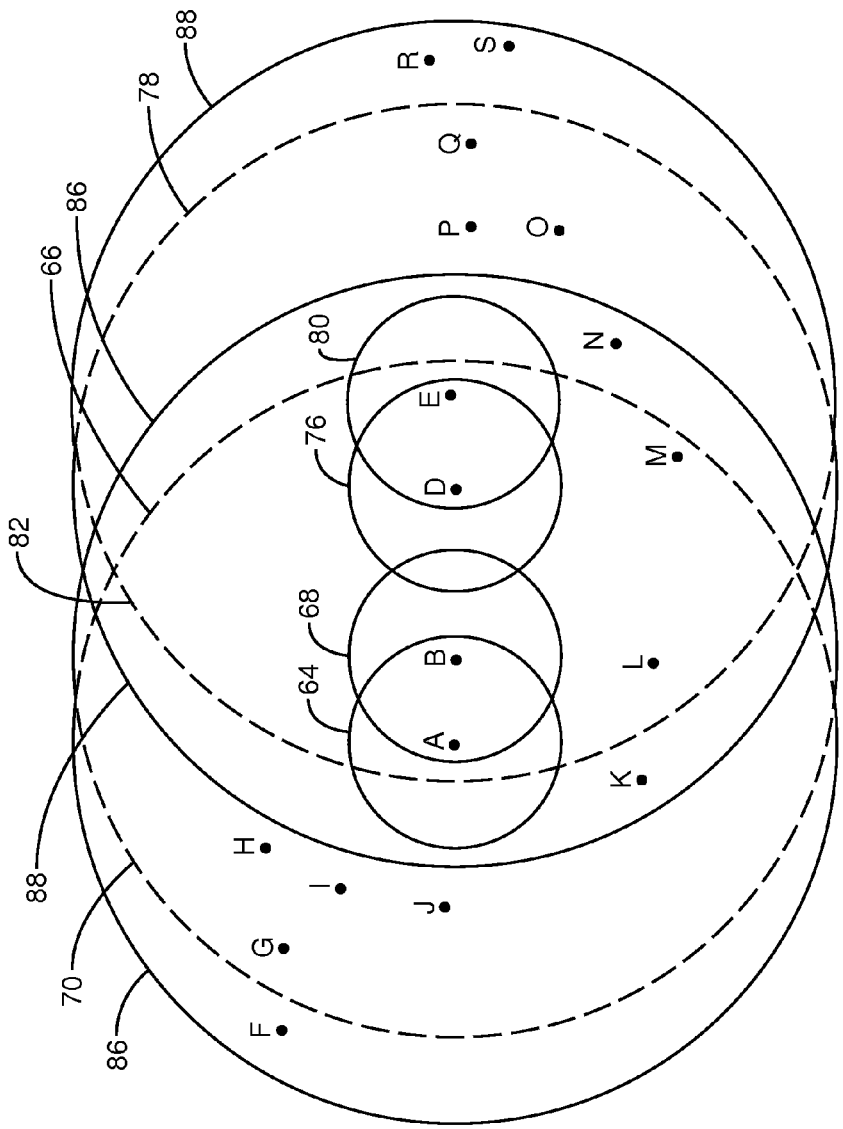

FIGS. 7 and 8 illustrate an exemplary process for removing a member from a proximity group according to one embodiment of the present invention. FIG. 7 illustrates a proximity group including users A through E as members. The user A has a proximate area 64 and an AOI 66. The user B has a proximate area 68 and an AOI 70. The user C has a proximate area 72 and an AOI 74. The user D has a proximate area 76 and an AOI 78, and the user E has a proximate area 80 and an AOI 82. As discussed above, the AOIs 66, 70, 74, 78, and 82 of the users A through E are combined to provide an aggregate AOI 84 for the proximity group, which is indicated by a solid line. Users F through S are within the aggregate AOI 84 of the proximity group and are therefore included in the aggregate neighbors list for the proximity group. As such, the users F through S are neighbors of each of the users A through E in the proximity group.

FIG. 8 illustrates a process for removing a member from the proximity group of FIG. 7 according to one embodiment of the present invention. In this example, the user C is to be removed from the proximity group because the user C is no longer proximate to any of the other members (users A, B, D, and E) of the proximity group. Normally, when a user is to be removed as a member of a proximity group, the user is removed from the list of members for the proximity group, and the neighbors within only the AOI of that user and not within the AOI of any other member of the proximity group are removed from the aggregate neighbors list for the proximity group. However, in this example, the proximity group is severed by the removal of the user C. More specifically, once the user C is removed, the users A and B are proximate to one another, and the users D and E are proximate to one another. However, neither of the users A or B are proximate to either of the users D or E. The chain of proximate relationships between the users A through E, which is referred to herein as a proximity chain, has been broken.

As a result, the proximity group must be severed into two proximity groups. A first proximity group including the users A and B is formed. A second proximity group including the users D and E is formed. The first proximity group including the users A and B has an aggregate AOI 86, which is indicated by a solid line. As such, the users F through N are considered neighbors of each of the users A and B in the first proximity group. As a result of severing the original proximity group, the users P through S are no longer neighbors of the users A and B in the first proximity group. The second proximity group including the users D and E has an aggregate AOI 88, which is indicated by a solid line. As such, the users K through S are considered neighbors of each of the users D and E in the second proximity group. As a result of severing the original proximity group, the users F through J are no longer neighbors of the users D and E in the second proximity group.

Figure 9A:
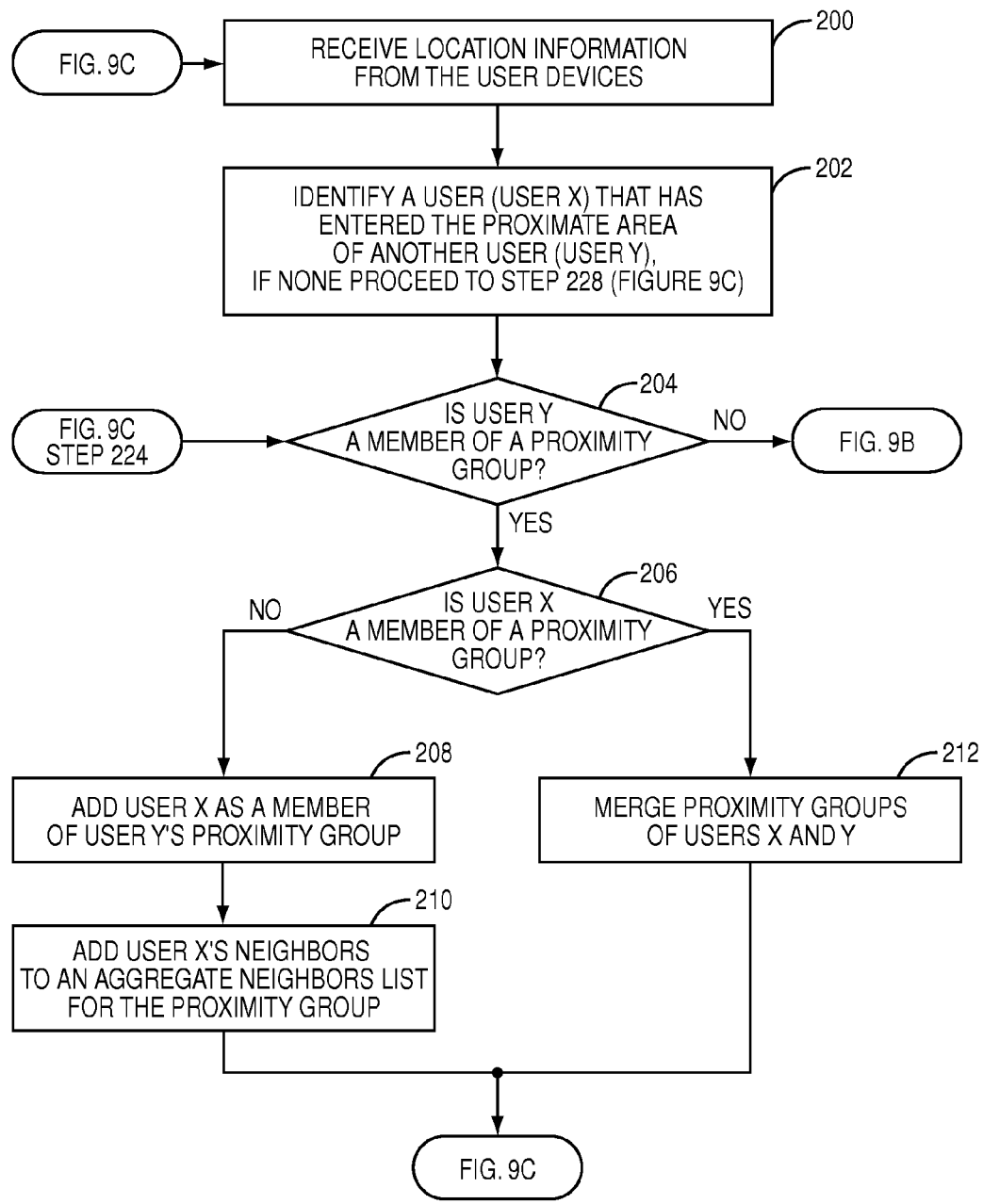
FIGS. 9A through 9C illustrate a flow chart describing the operation of the system of FIG. 1 according to one embodiment of the present invention.
Figure 9B:
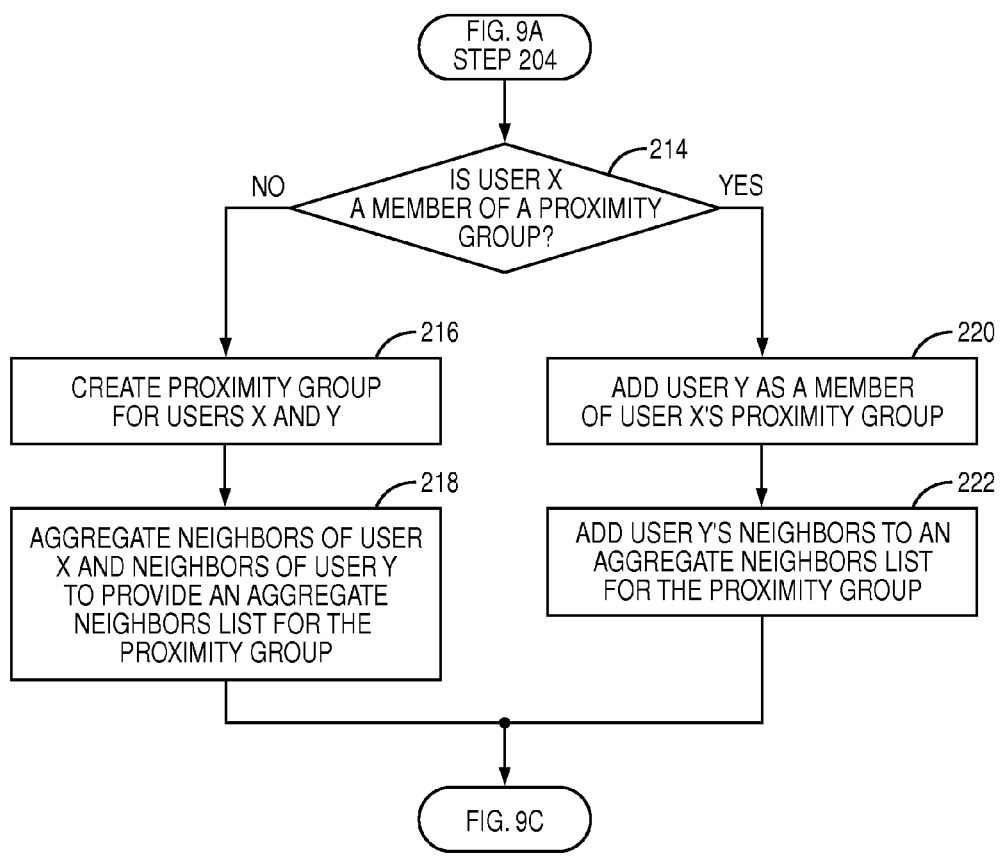
Figure 9C:
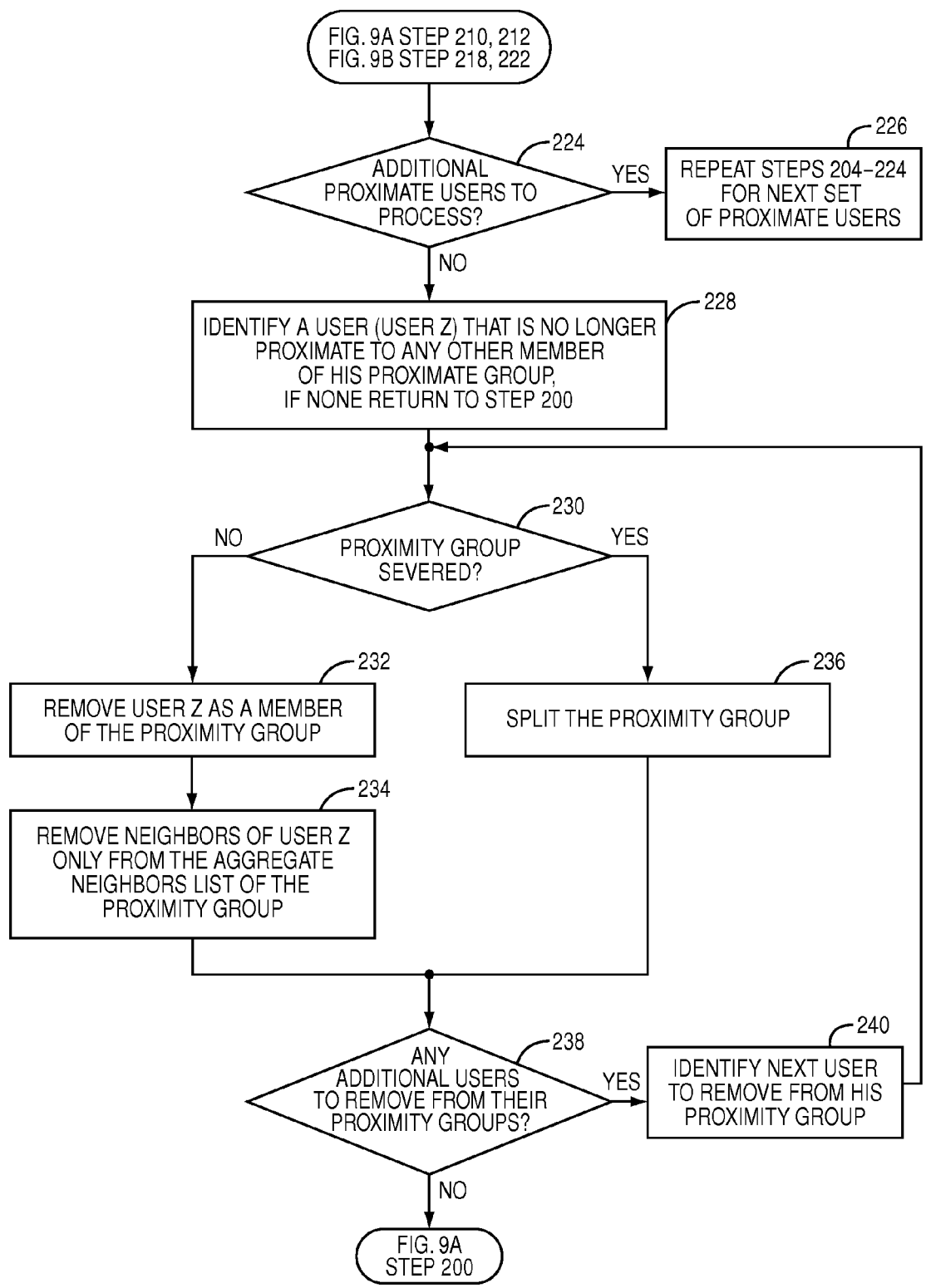

FIGS. 9A through 9C illustrate a flow chart describing the operation of the location matching function 20 (FIG. 1) according to one embodiment of the present invention. First, the location matching function 20 receives location information from the user devices 14-1 through 14-N identifying or otherwise providing the locations of the user devices 14-1 through 14-N (step 200). For this discussion, the locations of the user devices 14-1 through 14-N are also the locations of the users 18-1 through 18-N and are used as such. The location matching function 20 may receive location information from the user devices 14-1 through 14-N in any desired manner. For example, the user devices 14-1 through 14-N may provide the location information to the location matching function 20 periodically. Alternatively, the user devices 14-1 through 14-N may provide updates to their locations in response to changes in their locations. As a final example, the location matching function 20 may query the user devices 14-1 through 14-N for their locations periodically or as needed.

The location matching function 20 monitors the locations of the users 18-1 through 18-N to identify a first user, which is referred to as user X, that has entered or is otherwise new to the proximate area of a second user, which is referred to as user Y (step 202). If there are no new users within the proximate area of any other user, the process proceeds to step 228. Assuming that a user X has entered the proximate area of a user Y and that the users X and Y are not already members of the same proximity group, the location matching function 20 then determines whether the user Y is a member of a proximity group (step 204). In one embodiment, the user Y has a corresponding user network profile 22 (FIG. 1). If the user Y is a member of a proximity group, the user network profile 22 of the user Y includes a reference to that proximity group. If the user network profile 22 does not include a reference to a proximity group or if the reference to the proximity group is null, the user Y is not a member of a proximity group.

If the user Y is a member of a proximity group, the location matching function 20 then determines whether the user X is a member of a proximity group (step 206). If not, the location matching function 20 adds the user X as a member of the proximity group of user Y (step 208), and adds the neighbors of user X to the aggregate neighbors list for the proximity group of user Y (step 210). The neighbors of user X are other users within the AOI of the user X. Once the user X is added to the proximity group, the neighbors of user X become not only the original neighbors of user X located within the AOI of user X but also neighbors of all other users within the aggregate AOI of the proximity group.

Returning to step 206, if the user X is a member of a proximity group, then the users X and Y are members of separate proximity groups. As such, the location matching function 20 merges the proximity groups of users X and Y to provide a merged proximity group (step 212). In one embodiment, in order to merge the proximity groups, the location matching function 20 may merge the proximity group definition 24 of the proximity group of user X into the proximity group definition 24 of the proximity group of user Y, or vice versa. Alternatively, the location matching function 20 may merge the proximity group definitions 24 of the two proximity groups into a new proximity group definition 24 for the merged proximity group. In either case, the members of the merged proximity group are the members of the proximity group of user X and the members of the proximity group of user Y. In addition, the aggregate neighbors lists for the original proximity groups are merged to provide a single aggregate neighbors list for the merged proximity group. The user network profiles 22 of the members of the merged proximity group are updated, if necessary, to reference or otherwise identify the proximity group definition 24 of the merged proximity group.

Returning to step 204, if the user Y is not a member of a proximity group, the location matching function 20 determines whether the user X is a member of a proximity group (step 214, FIG. 9B). If not, the location matching function 20 creates a proximity group for the users X and Y (step 216). In one embodiment, the proximity group is created by creating a proximity group definition 24 listing the users X and Y as members. The location matching function 20 then aggregates the users located within the AOI of the user X and the users located within the AOI of the user Y to provide an aggregate neighbors list for the proximity group (step 218). The user network profiles 22 of the users X and Y are updated to reference or otherwise identify the proximity group definition 24 for their proximity group. As a result, the user X has neighbors including its neighbors located within its AOI as well as the neighbors of the user Y located within the AOI of the user Y. Likewise, the user Y has neighbors including its neighbors located within its AOI as well as the neighbors of the user X located within the AOI of the user X.

Returning to step 214, if the user X is a member of a proximity group, the location matching function 20 adds the user Y as a member of the proximity group of user X (step 220) and adds the neighbors of the user Y to the aggregate neighbors list for the proximity group (step 222). Note that if some of the neighbors of user Y are already included in the aggregate neighbors list as a result of also being the neighbors of other members of the proximity group, those users do not need to be added to the aggregate neighbors list.

At this point, whether proceeding from step 210 (FIG. 9A), step 212 (FIG. 9A), step 218 (FIG. 9B), or step 222 (FIG. 9B), the location matching function 20 determines whether there are additional proximate users to process (step 224, FIG. 9C). More specifically, based on the locations of the users 18-1 through 18-N, the location matching function 20 determines whether there are any more users having a new proximate neighbor that needs to be processed. If there are additional sets of proximate users to process, the location matching function 20 repeats steps 204 through 224 for each additional set of proximate users to be processed (step 226).

Once there are no additional proximate users to process, the location matching function 20 identifies a user, which is referred to as user Z, that is no longer proximate to any other member of his proximity group (step 228). If there are no such users, then the process returns to step 200. Assuming that there is a user Z that is no longer proximate to any other member of his proximity group, the location matching function 20 determines whether the removal of the user Z from the proximity group will sever the proximity group as discussed above with respect to FIGS. 7 and 8 (step 230). If not, the location matching function 20 removes the user Z as a member of the proximity group (step 232). The location matching function 20 also removes users within the AOI of the user Z but not within the AOI of any other member of the proximity group from the aggregate neighbors list (step 234). Returning to step 230, if the proximity group is severed by the removal of user Z, the location matching function 20 splits the proximity group into two or more proximity groups as discussed above with respect to FIGS. 7 and 8 (step 236).

At this point, the location matching function 20 determines whether there are any additional users to be removed from their proximity groups (step 238). If so, the next user to remove from his corresponding proximity group is identified (step 240). Steps 230 through 240 are repeated until there are no more users to remove from their proximity groups. At that point, the process returns to step 200 (FIG. 9A).

It should be noted that it may be desirable to limit the growth of the proximity groups discussed herein. Growth may be limited in a number of ways. For example, the proximate areas of the users may be hard-coded to a relatively small size as compared to the AOIs of the users. As another example, the proximate areas may be defined in a dynamic manner such that the proximate areas are limited to being relatively small as compared to the AOIs of the user. For example, the proximate areas of the users may be limited to 25% of the size of the AOIs of the users. As a third example, the proximate areas may be controlled by the users. As such, the users may control the sizes of their proximate areas in a manner that limits the size of their proximity group. As a fourth example, there may be a user-defined or system-defined limit on the number of members in a proximity group. As a final example, there may be a user-defined or system-defined limit on the size of the aggregate AOI of a proximity group.

Figure 10:
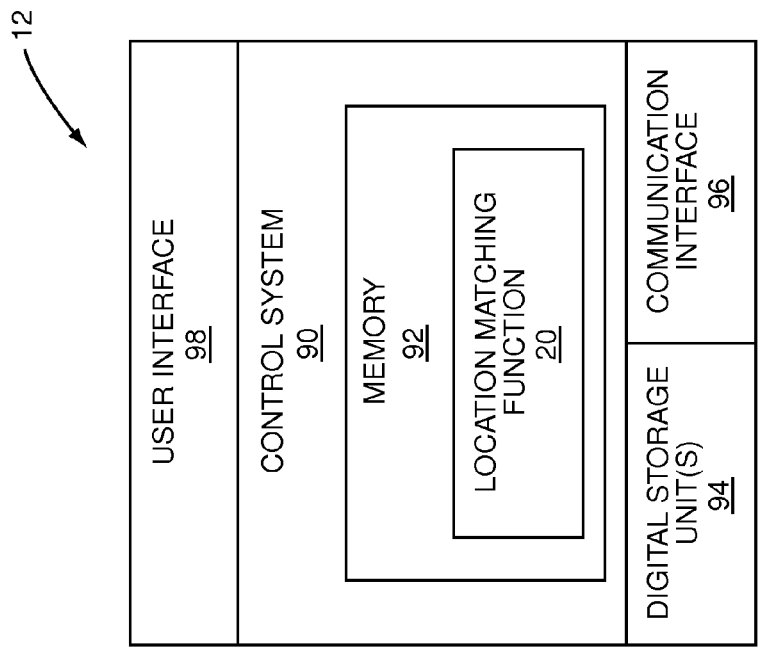
FIG. 10 is a block diagram of an exemplary embodiment of the central server system of FIG. 1.

FIG. 10 is a block diagram of the central server system 12 according to one embodiment of the present invention. In general, the central server system 12 includes a control system 90 having associated memory 92. In this embodiment, the location matching function 20 is implemented in software and stored in the memory 92. However, the present invention is not limited thereto. The central server system 12 may also include one or more digital storage units 94 for storing the user network profiles 22 and the proximity group definitions 24 (FIG. 1). However, the user network profiles 22 and/or the proximity group definitions 24 may alternatively be stored in the memory 92. The central server system 12 also includes a communication interface 96 enabling the central server system 12 to send and receive messages to the user devices 14-1 through 14-N via the network 16 (FIG. 1). The central server system 12 may also include a user interface 98, which may include components such as, for example, a display, one or more user input devices, and the like.

Figure 11:
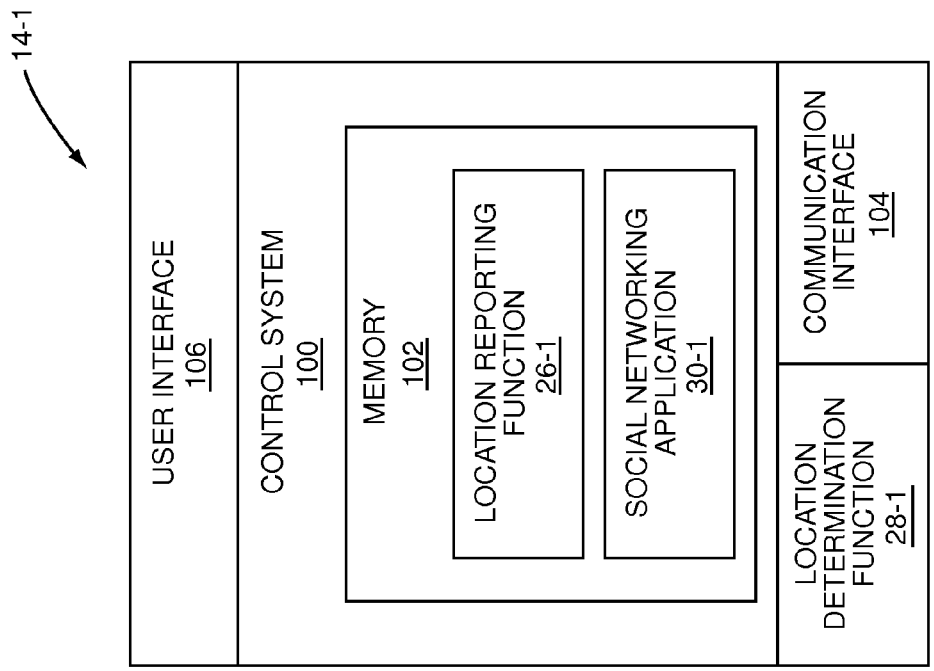
FIG. 11 is a block diagram of an exemplary embodiment of one of the user devices of FIG. 1.

FIG. 11 is a block diagram of the user device 14-1 according to one embodiment of the present invention. This discussion is equally applicable to the other user devices 14-2 through 14-N. In general, the user device 14-1 includes a control system 100 having associated memory 102. In this embodiment, the location reporting function 26-1 and the social networking application 30-1 are implemented in software and stored in the memory 102. However, the present invention is not limited thereto. The user device 14-1 also includes a location determination function 28-1 and a communication interface 104 enabling the user device 14-1 to communicate with the central server system 12 via the network 16 (FIG. 1). The user device 14-1 may also include a user interface 106, which may include components such as, for example, a display, one or more user input devices, and the like.

The present invention provides substantial opportunity for variation without departing from the spirit or scope of the present invention. For example, while the social networking applications 30-1 through 30-N of FIG. 1 are illustrated as being implemented on the user devices 14-1 through 14-N, the present invention is not limited thereto. For example, a social networking application such as an online social networking website may be implemented on a central server system such as, but not limited to, the central server system 12. As another example, while the location matching function 20 is described herein as being implemented on the central server system 12, the present invention is not limited thereto. The present invention may alternatively be implemented in a Peer-to-Peer (P2P) architecture. For example, the location matching function 20, the user network profiles 22, and the proximity group definitions 24 may be implemented on one of the user devices 14-1 through 14-N or distributed among two or more of the user devices 14-1 through 14-N.

Those skilled in the art will recognize improvements and modifications to the preferred embodiments of the present invention. All such improvements and modifications are considered within the scope of the concepts disclosed herein and the claims that follow.

What is claimed is:

1. A non-transitory computer readable medium storing software for instructing a server to:
   identify a first proximity group comprising a first plurality of users, each user of the first plurality of users being within a proximate area of at least one other user of the first plurality of users and having an area of interest; each of the proximate area and the area of interest corresponding to geographic regions where the area of interest is larger than the proximate area; and
   identify at least one additional user within an aggregate of the areas of interests of the first plurality of users in the first proximity group as a neighbor of each of the first plurality of users in the first proximity group.

2. The non-transitory computer readable medium of claim 1 wherein the first proximity group comprises a first user and a second user, the first user having a first proximate area within which the second user is located and a first area of interest that is larger than the first proximate area and the second user having a second proximate area within which the first user is located and a second area of interest that is larger than the second proximate area.

3. The non-transitory computer readable medium of claim 2 wherein instructing the server to identify the at least one additional user within the aggregate of the areas of interest of the first plurality of users in the first proximity group comprises instructing the server to identify at least one first additional user located within the second area of interest of the second user and outside of the first area of interest of the first user as a neighbor of both the first and second users.

4. The non-transitory computer readable medium of claim 3 wherein instructing the server to identify the at least one additional user within the aggregate of the areas of interest of the first plurality of users in the first proximity group further comprises instructing the server to identify at least one second additional user within the first area of interest of the first user and outside of the second area of interest of the second user as a neighbor of both the first and second users.

5. The non-transitory computer readable medium of claim 4 wherein instructing the server to identify the at least one additional user within the aggregate of the areas of interest of the first plurality of users in the first proximity group further comprises instructing the server to identify at least one third additional user within both the first and second areas of interest as a neighbor of both the first and second users.

6. The non-transitory computer readable medium of claim 1 wherein for each user of the first plurality of users in the first proximity group, the server to instructed to use the neighbor as a potential member of a user network of the user.

7. The non-transitory computer readable medium of claim 6 wherein the user network includes at least one of a social network and a peer-to-peer recommendation network.

8. The non-transitory computer readable medium of claim 1 wherein the software is for further instructing the server to:
identify a new user that is located within the proximate area of at least one of the first plurality of users in the first proximity group; and
add the new user to the first proximity group.

9. The non-transitory computer readable medium of claim 1 wherein the software is for further instructing the server to:
identify a new user that is located within the proximate area of at least one of the first plurality of users in the first proximity group, the new user being a member of a second proximity group comprising a second plurality of users including the new user;
merge the first and second proximity groups to provide a merged proximity group comprising the first and second pluralities of users; and
identify at least one additional user within an aggregate of the areas of interest of the first and second pluralities of users in the merged proximity group as a neighbor of each of the first and second pluralities of users in the merged proximity group.

10. The non-transitory computer readable medium of claim 1 wherein the software is for further instructing the server to:
identify a user of the first plurality of users that is no longer within the proximate area of any other user of the first plurality of users; and
remove the user as a member of the first proximity group.

11. The non-transitory computer readable medium of claim 10 wherein the software is for further instructing the server to remove at least one user that is located within the area of interest of the user removed from the first proximity group and not located within the area of interest of any other user of the first plurality of users remaining in the first proximity group as a neighbor of the other users of the first plurality of users remaining in the first proximity group.

12. The non-transitory computer readable medium of claim 10 wherein removing the user as a member of the first proximity group severs a chain of proximity between at least two subsets of the first plurality of users, and wherein the software is for further instructing the server to:
split the first proximity group into at least two separate proximity groups, each comprising one of the at least two subsets of the first plurality of users; and
for each subset of the first plurality of users from the at least two subsets, identify at least one additional user within an aggregate of the areas of interest of the subset of the first plurality of users as a neighbor of each of the subset of the first plurality of users.

13. A method comprising:
receiving an identification of an area of interest associated with a user of a user device, the area of interest corresponding to a first geographic region;
transmitting the identification of the area of interest associated with the user to a server;
determining a location of the user device;
transmitting the location to the server; and
receiving information identifying a proximity group comprising the user and a plurality of other users, wherein the proximity group includes at least one other user of the plurality of other users being within a proximate area of the location of the user device and having an area of interest corresponding to the area of interest of the user, the proximate area corresponding to a second geographic region smaller than the area of interest, the proximity group further comprising at least one additional other user of the plurality of other users within an aggregate of the areas of interests of the user and the at least one other user and identified as a neighbor of each of the user and the at least one other user in the proximity group.

14. The method of claim 13 further comprising receiving a user profile associated with the user, the user profile including the information identifying the proximity group.

15. The method of claim 14 wherein the user profile further includes information identifying at least one neighbor of the user.

16. The method of claim 13 further comprising receiving, for each of the plurality of other users in the proximity group, information identifying each of the plurality of other users as a potential member of a user network of the user.

17. The method of claim 16 wherein the user network includes at least one of a social network and a peer-to-peer recommendation network.

18. A user device comprising:
a control system adapted to:
receive an identification of an area of interest associated with a user of a user device, the area of interest corresponding to a first geographic region;
a location determination component configured to identify the location of the user device;
a communication interface for communicating with a server in communication with a plurality of other user devices via a network, the plurality of other user devices associated with a plurality of other users;
the communication interface configured to
transmit the identification of the area of interest associated with the user to the server;
transmit the location to the server; and
receive information identifying a proximity group comprising the user and the plurality of other users, wherein the proximity group includes at least one other user of the plurality of other users being within a proximate area of the location of the user device and having an area of interest corresponding to the area of interest of the user, the proximate area corresponding to a second geographic region smaller than the area of interest, the proximity group further comprising at least one additional other user of the plurality of other users within an aggregate of the areas of interests of the user and the at least one other user and identified as a neighbor of each of the user and the at least one other user in the proximity group.

19. The user device of claim 18 wherein the communication interface is further configured to receive a user profile associated with the user, the user profile including the information identifying the proximity group.

20. The user device of claim 19 wherein the user profile further includes information identifying at least one neighbor of the user.

21. The user device of claim 18 wherein the communication interface is further configured to receive, for each of the plurality of other users in the proximity group, information identifying each of the plurality of other users as a potential member of a user network of the user.

22. The user device of claim 21 wherein the user network includes at least one of a social network and a peer-to-peer recommendation network.

23. A non-transitory computer readable medium storing software for instructing a user device to:
    receive an identification of an area of interest associated with a user of a user device, the area of interest corresponding to a first geographic region;
    transmit the identification of the area of interest associated with the user to a server;
    determine a location of the user device;
    transmit the location to the server; and
    receive information identifying a proximity group comprising the user and a plurality of other users, wherein the proximity group includes at least one other user of the plurality of other users being within a proximate area of the location of the user device and having an area of interest corresponding to the area of interest of the user, the proximate area corresponding to a second geographic region smaller than the area of interest, the proximity group further comprising at least one additional other user of the plurality of other users within an aggregate of the areas of interests of the user and the at least one other user and identified as a neighbor of each of the user and the at least one other user in the proximity group.

* * * * *